United States Patent
Henning et al.

(10) Patent No.: US 6,823,832 B2
(45) Date of Patent: Nov. 30, 2004

(54) METHOD AND DEVICE FOR CONTROL OF THE FUEL INJECTION IN AN INTERNAL COMBUSTION ENGINE

(75) Inventors: Ruben-Sebs Henning, Stuttgart (DE); Klemens Brack, Stuttgart (DE); Andreas Kerst, Stuttgart (DE); Burkhard Veldten, Edemissen (DE); Dietmar Ottenbacher, Holzgerlingen (DE); Iris Sauerwein, Stuttgart (DE); Stefan Becher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,286

(22) PCT Filed: Feb. 10, 2001

(86) PCT No.: PCT/DE01/00514
§ 371 (c)(1),
(2), (4) Date: Jan. 8, 2003

(87) PCT Pub. No.: WO01/66927
PCT Pub. Date: Sep. 13, 2001

(65) Prior Publication Data
US 2003/0177762 A1 Sep. 25, 2003

(30) Foreign Application Priority Data

Mar. 9, 2000 (DE) .......................... 100 11 408
Jul. 27, 2000 (DE) .......................... 100 36 579

(51) Int. Cl.⁷ ................................. F02B 3/00
(52) U.S. Cl. ................. 123/299; 123/300; 123/526
(58) Field of Search ................. 123/295, 299, 123/300, 27 GE, 526; 60/284, 285, 286

(56) References Cited

U.S. PATENT DOCUMENTS

| 4,704,999 | A | * | 11/1987 | Hashikawa et al. ........ 123/299 |
| 5,168,847 | A | * | 12/1992 | Grieshaber et al. ........ 123/299 |
| 5,884,602 | A | * | 3/1999 | Friedrich et al. ........... 123/300 |
| 6,062,194 | A | * | 5/2000 | Schwarz ..................... 123/299 |
| 6,378,297 | B1 | * | 4/2002 | Ito et al. ....................... 60/284 |
| 6,470,849 | B1 | * | 10/2002 | Duffy et al. ................ 123/299 |
| 6,484,689 | B1 | * | 11/2002 | Hasegawa ................... 123/299 |

FOREIGN PATENT DOCUMENTS

| DE | 196 32 650 | 3/1998 |
| DE | 197 12 143 | 9/1998 |
| EP | 0 953 756 | 11/1999 |
| JP | 02 277 940 | 11/1990 |
| JP | 05 001 609 | 1/1993 |
| JP | 11 173 186 | 6/1999 |

* cited by examiner

Primary Examiner—Tu M. Nguyen
(74) Attorney, Agent, or Firm—Kenyon & Kenyon

(57) ABSTRACT

In a method and a device for controlling the injection of fuel into an internal combustion engine, a distinction is made at least between a first state and a second state. Immediately before the transition from the first state to the second state, the injection data is altered so that the emissions, in particular the production of noise, are gradually made to approximate the emissions in the second state.

10 Claims, 4 Drawing Sheets

METHOD AND DEVICE FOR CONTROL OF THE FUEL INJECTION IN AN INTERNAL COMBUSTION ENGINE

FIELD OF THE INVENTION

The present invention relates to a method and a device for controlling the injection of fuel into an internal combustion engine.

BACKGROUND INFORMATION

Such a method and such a device for controlling the injection of fuel into an internal combustion engine are known from German Published Patent Application No. 197 12 143, for example. In the procedure described there, fuel injection is divided into a pilot injection and a main injection. Noise emissions can be greatly reduced by a pilot injection.

Pilot injection frequently does not occur in all operating states. This means that in a first operating state there is a pilot injection and in a second operating state there is no pilot injection. In an abrupt switch from one state having pilot injection to an operating state without pilot injection, there is a sudden increase in combustion noise. This increase in combustion noise is perceived by the driver as very irritating.

SUMMARY OF THE INVENTION

The procedure according to the present invention makes it possible to greatly reduce the sudden increase in combustion noises in switching from an operating state having a first partial injection and a second partial injection to an operating state without a first partial injection. The first partial injection is preferably a pilot injection which occurs immediately before the second partial injection, also referred to as a main injection.

This is achieved according to the present invention by the fact that before a switch from a first state to a second state without having pilot injection, the noise produced is altered so that the noise emission levels before the switch and after the switch are approximately the same. This is achieved by the fact that the injection data is altered so that even before the switch to the second state, the noise emissions are adapted to the noise emission in the second state. In particular, the duration and/or frequency of the pilot injections is altered.

The pilot injection data is usually selected so that a minimum of noise emission occurs. It has been found according to the present invention that it is possible to adjust the noise by increasing or decreasing the pilot injection quantity. Lengthening the pilot injection duration is particularly advantageous.

In another embodiment, it is possible to provide for the pilot injections to be suppressed continuously more and more frequently in the transition to a state without pilot injection. This means that immediately before the transition every n-th pilot injection is omitted. The number n is decreased slowly to a value of 1 according to a certain scheme starting from a large value. This means, for example, that at the beginning, one in ten injections is suppressed, and at the conclusion of the transition all injections are suppressed.

DETAILED DESCRIPTION

Figure 1:
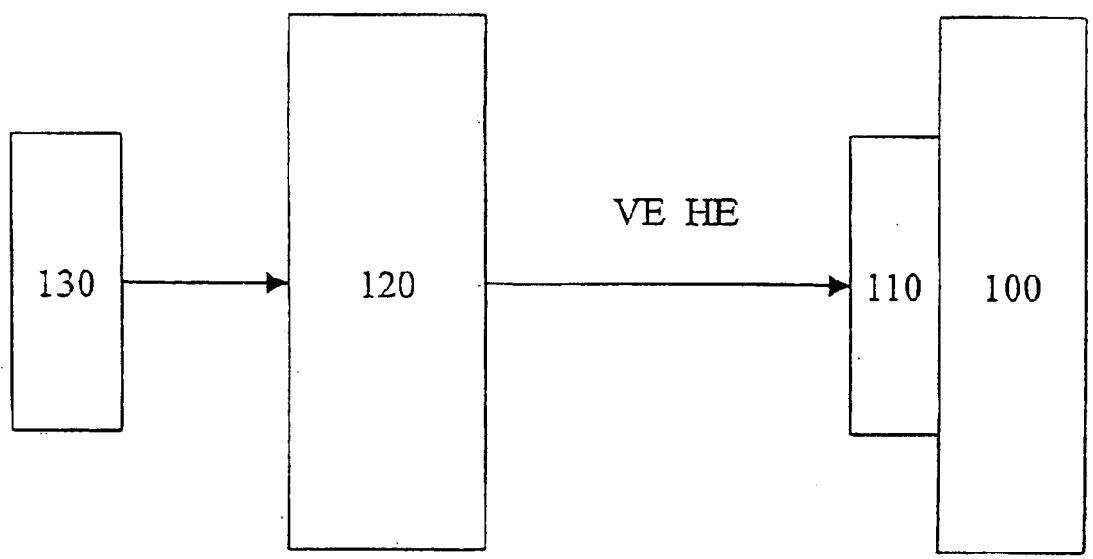
FIG. 1 shows a fuel metering system, illustrated schematically as a block diagram.

FIG. 1 shows the essential elements of a fuel metering system of an internal combustion engine, shown schematically as a block diagram. Fuel is metered to an internal combustion engine 100 by a fuel metering device 110. The fuel metering device receives trigger signals VE and HE from a control unit 120. The control unit receives output signals from various sensors 130.

Sensors 130 detect various operating characteristics of the engine as well as various environmental conditions, including in particular signals pertaining to the engine rpm and various temperature and pressure values. On the basis of these signals and the driver's intent, control unit 120 calculates signals VE and HE, which are sent to fuel metering device 110.

In direct-injection diesel engines in particular, the quantity of fuel to be injected is divided into at least one pilot injection and one main injection. In addition to the pilot injection and main injection, additional partial injections such as a second pilot injection and/or a post-injection are also possible. In addition, the main injection may also be divided into additional partial injections. In the exemplary embodiment presented here, only one pilot injection and one main injection are provided.

Signal VE determines the pilot injection and HE determines the main injection. Essentially these signals determine the start and quantity of the respective injection. Depending on these signals, fuel metering device 110 meters a corresponding quantity of fuel to engine 100.

In FIG. 2, the injection curves, i.e., the trigger signal for the fuel metering device or a corresponding variable is plotted as a function of time t. The pilot injection is again labeled as VE and the main injection as HE.

Figure 2A:
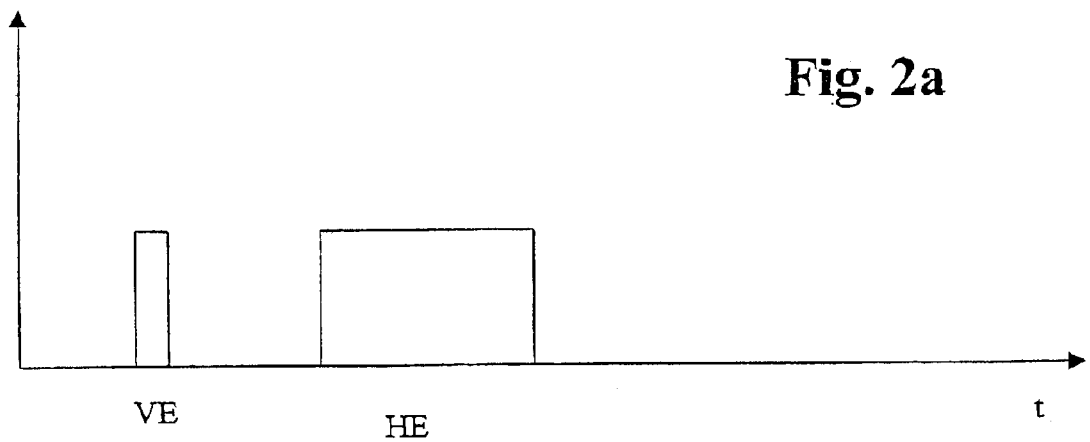
FIG. 2 shows the time charts of three injections.
Figure 2B:
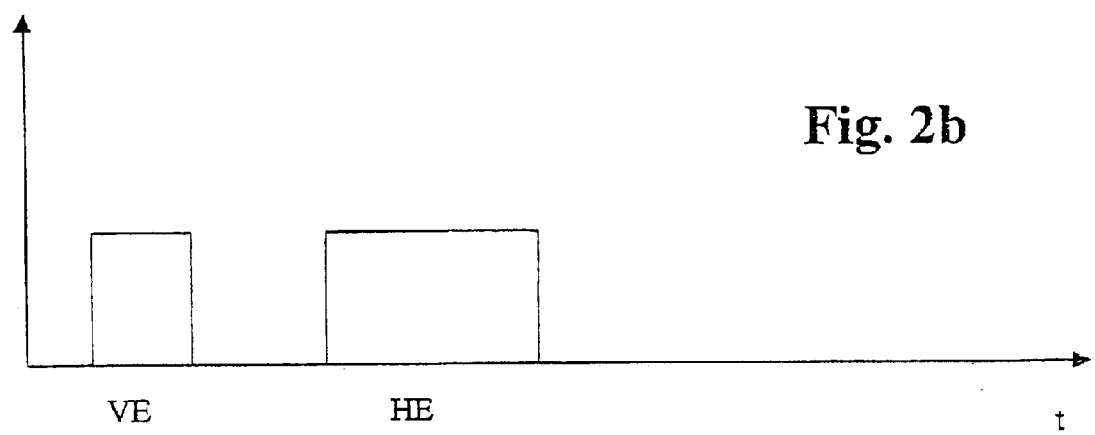
Figure 2C:
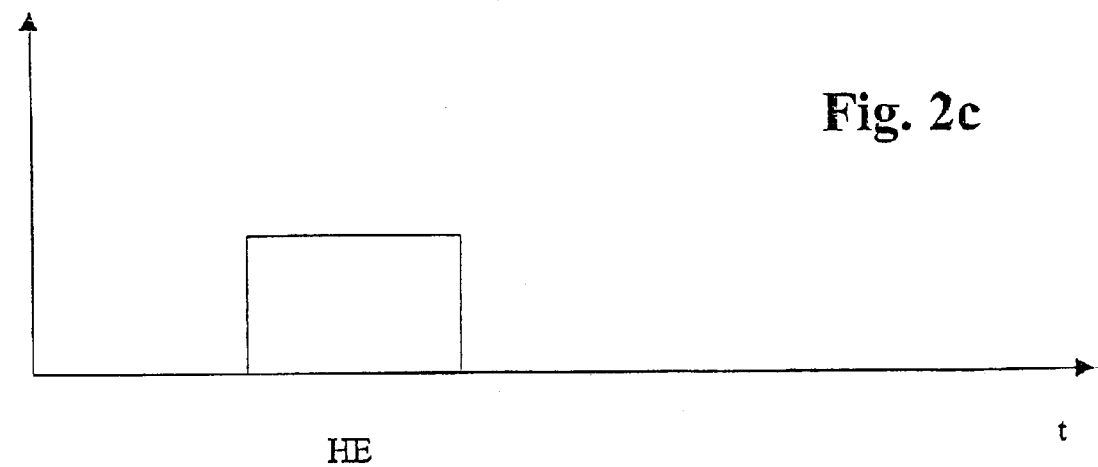

FIG. 2a illustrates an operating state having a pilot injection in which approx. 5% of the injection quantity is metered in pilot injection. FIG. 2c illustrates an injection without having a pilot injection. FIG. 2b shows the transition from the state having pilot injection to the state without pilot injection.

During the transition, the quantity of the pilot injection is increased, i.e., the duration of the pilot injection is prolonged continuously. The quantity of the main injection is preferably reduced by a corresponding amount, which is selected so that the torque delivered will remain constant.

If the noise reaches the level usually reached in this operating state without pilot injection, pilot injection VE is set at zero, and the main injection is advanced.

This means that in order to reduce the sudden increase in combustion noise after shutting down the pilot injection, the combustion noise is continuously increased according to the present invention before shutting down the pilot injection. To do so in this embodiment, the pilot injection quantity is increased up to 60% of the total injection quantity. The pilot injection quantity is thus increased to the extent that the combustion pressure gradient at the ignition point in time of pilot injection corresponds to the combustion pressure gradient in operation without pilot injection. The combustion pressure gradient corresponds to the change in combustion pressure at the moment of ignition.

Therefore, the combustion noise immediately before shutdown of pilot injection is approximately equal to the combustion noise after shutdown of pilot injection.

It is especially advantageous that increasing the pilot injection quantity not only yields a reduction in noise but also shifts most of the combustion to an earlier point in time. This reduces the sudden change in position of the injection timer, which is necessary for equalization of the start-of-injection change in the main injection in shutdown of pilot injection.

In shifting to the state without pilot injection, the overall combustion must be adjusted in the sense of advancing it, so that appropriate combustion values and/or emission values are achieved and/or a corresponding torque is delivered by the engine. By advancing most of the pilot injection quantity, the overall combustion is advanced. The combustion timing difference as pilot injection is shut down is much less in this embodiment according to the present invention than with other switching strategies.

In a second embodiment of the procedure according to the present invention, the combustion noise before shutdown of the pilot injection is increased by shutting down, i.e., suppressing pilot injection initially for individual injections in the transition to a state without pilot injection. The relative frequency of this individual shutdown of pilot injections in individual meterings is designed so that it increases continuously. This means that with every n-th injection, pilot injection is suppressed, with the number n decreasing continuously from a high value to a low value, preferably 1. At a value of 1, there is no pilot injection, and at a high value practically every pilot injection occurs. The pattern of the injections enabled and suppressed is based on psychoacoustic requirements.

Figure 3:
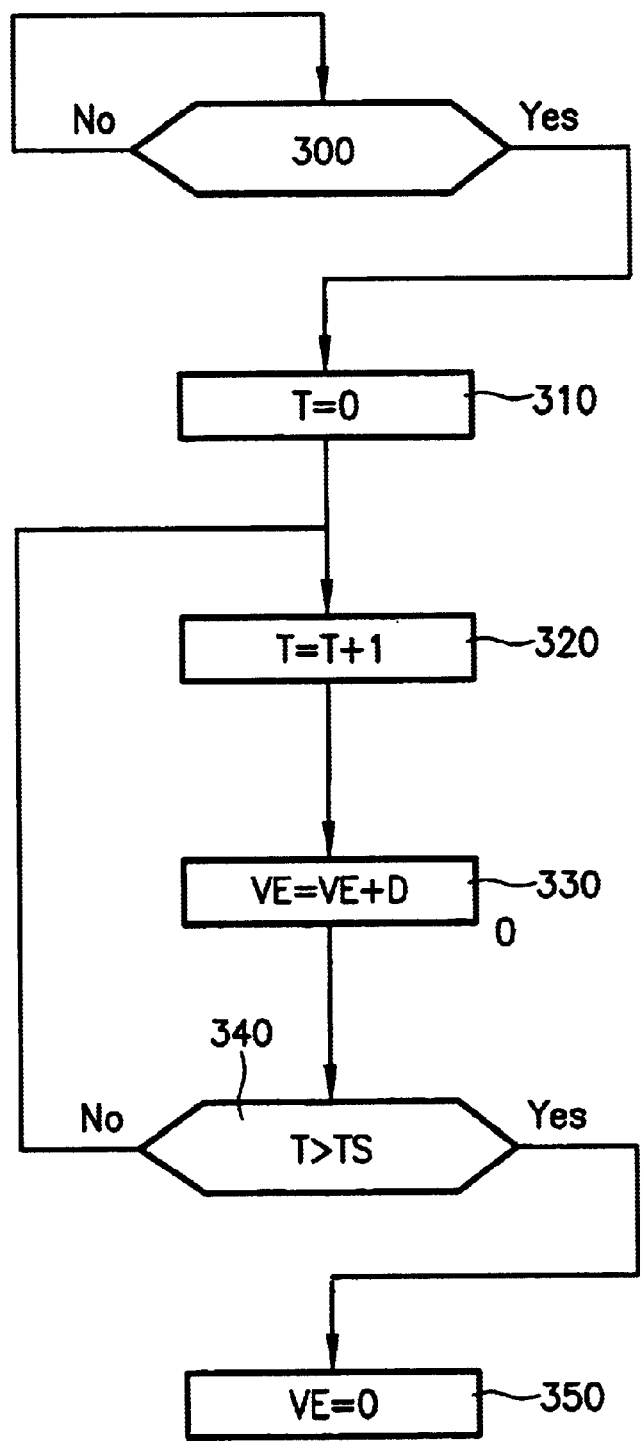
FIG. 3 shows a first flow chart of the procedure according to the present invention.

FIG. 3 illustrates the procedure according to the present invention in the form of a block diagram. A first query 300 checks on whether the prevailing operating state is one in which the pilot injection is to be shut down. If this is not the case, query 300 is made again. If this is the case, a time counter T is set at zero at step 310. Then in step 320, time counter T is incremented by 1. In the next step 330, pilot injection quantity VE is increased by value D. This query 340 checks on whether the time counter is greater than a threshold value TS. If this is not the case, step 320 is performed again. If this is the case, then in step 350 pilot injection VE is set at zero, i.e., it is shut down, and the main injection is adjusted accordingly. In the embodiment illustrated here, the transition from a state with pilot injection to a state without pilot injection takes place in a time-controlled manner.

According to the present invention, instead of time query 340, there may be a corresponding query at which a check is performed to determine whether the duration and/or quantity of pilot injection VE is greater than a threshold value. As an alternative, it is also possible to provide for another measured quantity to be checked for whether a threshold value is exceeded and then step 350 follows.

In another embodiment of the procedure according to the present invention, the combustion noise before shutdown of pilot injection is increased by reducing the fuel pressure briefly immediately prior to or together with the shutdown of pilot injection. This achieves an intermediate level of noise emission between operation with and without pilot injection. It is especially advantageous if the reduction in fuel pressure and the shutdown of pilot injection take place simultaneously with the reduction in fuel pressure. This makes it possible to prevent increased particulate emissions from occurring briefly when operating with pilot injection and a reduced fuel pressure.

Figure 4:
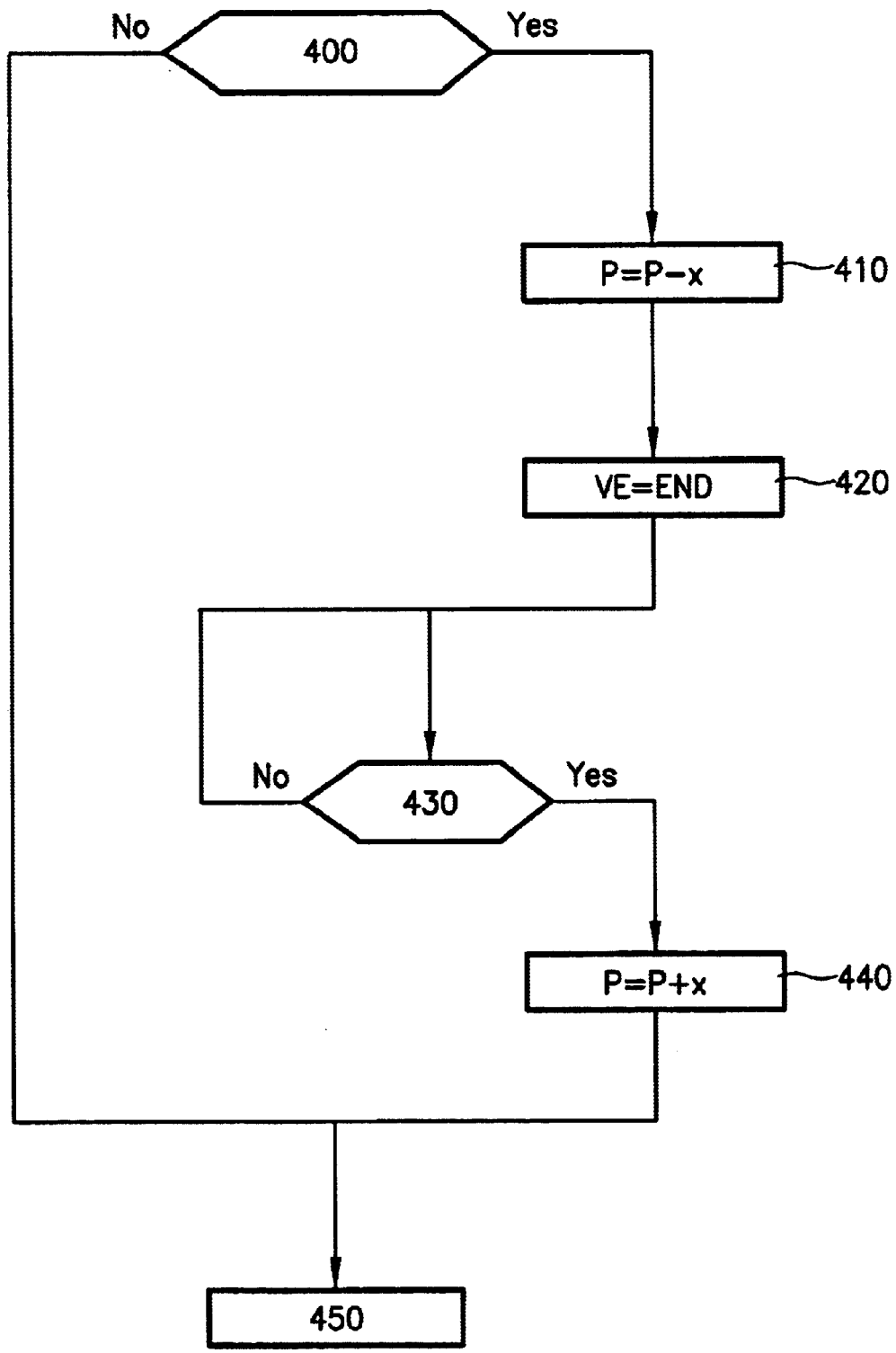
FIG. 4 shows a second flow chart of the procedure according to the present invention.

FIG. 4 illustrates the procedure according to the present invention in the form of a block diagram. A first query 400 checks on whether an operating state in which pilot injection is to be shut down exists. If this is not the case, the program continues in normal operation with step 450. If query 400 finds that the pilot injection is to be shut down, then in step 410 fuel pressure P is reduced by a certain value x.

With a common-rail system, this is preferably achieved by reducing the setpoint value of a rail pressure regulation system by a corresponding absolute value. As an alternative, it is possible for a pressure regulating valve to be triggered briefly accordingly. In the case of other fuel metering systems, other suitable measures are used for lowering the fuel pressure.

In the next step 420, pilot injection VE is set at zero, i.e., pilot injection is shut down in step 420. The next query 430 checks on whether a time condition has been met. If it has not been met, query 430 is issued again. If time condition 430 is met, i.e., the pressure has been reduced for a certain period of time, then in step 440, pressure P is increased to its previous level. Then the program continues its normal operation in step 450.

It is especially advantageous if steps 410 and 420 take place simultaneously.

It is especially advantageous if a corresponding procedure is also followed in the transition from a state without pilot injection to a state with pilot injection. For example, it is possible to provide for the number of pilot injections not to be increased abruptly to the intended value but instead to be increased continuously.

Furthermore, this procedure may also be used with systems having more than two partial injections.

What is claimed is:

1. A method of controlling an injection of a fuel into an internal combustion engine, a distinction being made at least between a first state and a second state, the method comprising:

causing at least a first partial injection and a second partial injection to occur in the first state;

preventing the first partial injection from taking place in the second state; and immediately altering injection data before a transition from the first state to the second state, so that emissions are gradually made to achieve an approximation of emissions in the second state, wherein:

a frequency of injections including the first partial injection is altered in order to achieve the approximation.

2. The method as recited in claim 1, wherein:
   the emissions include generated noise.

3. The method as recited in claim 1, further comprising:
   continuously increasing the emissions.

4. The method as recited in claim 1, further comprising:
   continuously reducing those injections including the first partial injection.

5. The method as recited in claim 1, wherein the frequency of injections is altered by suppressing one or more of the injections.

6. The method as recited in claim 5, wherein the one in ten injections is suppressed at a beginning of the transition and all injections are suppressed at a conclusion of the transition.

7. The method as recited in claim 5, further comprising:
   simultaneously reducing a fuel pressure while suppressing the injections.

8. A device for controlling an injection of a fuel into an internal combustion engine, a distinction being made at least between a first state and a second state, the device comprising:

an arrangement for causing at least a first partial injection and a second partial injection to occur in the first state;

an arrangement for preventing the first partial injection from taking place in the second state; and an arrangement for immediately altering injection data before a transition from the first state to the second state, so that emissions are gradually made to achieve an approximation of emissions in the second state, wherein:

a frequency of injections including the first partial injection is altered in order to achieve the approximation.

9. A method of controlling an injection of a fuel into an internal combustion engine, a distinction being made at least between a first state and a second state, the method comprising:

causing at least a first partial injection and a second partial injection to occur in the second state;

preventing the first partial injection from taking place in the first state; and immediately altering injection data before a transition from the first state to the second state, so that emissions are gradually made to achieve an approximation of emissions in the second state, wherein:

a frequency of injections including the first partial injection is altered in order to achieve the approximation, and the emissions include generated noise.

10. A device for controlling an injection of a fuel into an internal combustion engine, a distinction being made at least between a first state and a second state, the device comprising:

an arrangement for causing at least a first partial injection and a second partial injection to occur in the second state;

an arrangement for preventing the first partial injection from taking place in the first state; and an arrangement for immediately altering injection data before a transition from the first state to the second state, so that emissions are gradually made to achieve an approximation of emissions in the second state, wherein:

a frequency of injections including the first partial injection is altered in order to achieve the approximation and the emissions include generated noise.

* * * * *